US 11,685,215 B2

(12) United States Patent
Kizu et al.

(10) Patent No.: US 11,685,215 B2
(45) Date of Patent: Jun. 27, 2023

(54) LOAD ESTIMATION DEVICE

(71) Applicant: AISIN CORPORATION, Aichi (JP)

(72) Inventors: Masahito Kizu, Kariya (JP); Takanori Suzuki, Kariya (JP)

(73) Assignee: AISIN CORPORATION, Kariya (JP)

( * ) Notice: Subject to any disclaimer, the term of this patent is extended or adjusted under 35 U.S.C. 154(b) by 447 days.

(21) Appl. No.: 16/788,370

(22) Filed: Feb. 12, 2020

(65) Prior Publication Data
US 2020/0262265 A1 Aug. 20, 2020

(30) Foreign Application Priority Data
Feb. 15, 2019 (JP) ................................. 2019-025094

(51) Int. Cl.
*B60G 17/052* (2006.01)
*B60G 11/27* (2006.01)

(52) U.S. Cl.
CPC ............ *B60G 17/052* (2013.01); *B60G 11/27* (2013.01); *B60G 2202/152* (2013.01); *B60G 2400/25* (2013.01); *B60G 2400/5122* (2013.01); *B60G 2400/7122* (2013.01)

(58) Field of Classification Search
USPC ........................................................ 701/37
See application file for complete search history.

(56) References Cited

U.S. PATENT DOCUMENTS

| 2011/0093166 A1* | 4/2011 | Li ..................... B60G 17/019 701/40 |
| 2017/0166027 A1* | 6/2017 | Rutkowski ............. B60G 13/06 |
| 2018/0304717 A1* | 10/2018 | Mettrick ................ B60G 11/27 |
| 2021/0001678 A1* | 1/2021 | Koyama .................. B60S 1/54 |

FOREIGN PATENT DOCUMENTS

| JP | 62-29409 A | 2/1987 |
| JP | 4-161827 A | 6/1992 |
| JP | 2015-205523 A | 11/2015 |
| JP | 2015-206591 A | 11/2015 |

OTHER PUBLICATIONS

Japanese Office Action dated Sep. 12, 2022 in Japanese Patent Application No. 2019-025094 (with unedited computer generated English Translation), citing reference 15 therein, 8 pages.

* cited by examiner

*Primary Examiner* — Maceeh Anwari
(74) *Attorney, Agent, or Firm* — Oblon, McClelland, Maier & Neustadt, L.L.P.

(57) ABSTRACT

A load estimation device includes: an air spring having a diaphragm that expands and contracts due to supply and exhaust of air, and configured to support a support body in a liftable manner; an auxiliary support portion configured to support the support body separately from the air spring; a displacement sensor configured to measure a length of the air spring; a pressure sensor configured to measure an internal pressure of the air spring; a temperature sensor disposed together with the air spring, and configured to measure a temperature of the air spring; and a calculation unit configured to calculate a spring load supported by the air spring based on measured results of the displacement sensor, the pressure sensor and the temperature sensor.

3 Claims, 4 Drawing Sheets

LOAD ESTIMATION DEVICE

CROSS REFERENCE TO RELATED APPLICATIONS

This application is based on and claims priority under 35 U.S.C. § 119 to Japanese Patent Application 2019-025094, filed on Feb. 15, 2019, the entire contents of which are incorporated herein by reference.

TECHNICAL FIELD

This disclosure relates to a load estimation device including an air spring that expands and contracts due to supply and exhaust of air, and configured to calculate a spring load supported by the air spring based on a length and an internal pressure of the air spring.

BACKGROUND DISCUSSION

In related art, for example, the following JP 2015-205523A (Reference 1) discloses such a load estimation device.

This device is a weight estimation device mounted on a vehicle body, and has an internal pressure detecting means for detecting an internal pressure of an air spring and an up/down displacement detecting means for detecting a height of a structure relative to a reference height.

In this device, a correspondence between any internal pressure of the air spring and a spring borne basic load is stored in a basic load calculation information storage means as basic load calculation information. In addition, a correspondence between any up/down displacement of the structure when being raised and lowered and a spring borne correction load is stored in a correction load calculation information storage means as correction load calculation information in raising and lowering directions.

A basic load calculation means calculates a spring borne basic load by using the internal pressure detected by the internal pressure detecting means and the basic load calculation information. In addition, a correction load calculation means calculates a spring borne correction load by using the up/down displacement of the structure when being raised and lowered and the correction load calculation information in the raising and lowering directions. A spring borne load calculation means calculates a spring borne load that is borne by the air spring by adding the spring borne correction load to the spring borne basic load.

In the related art, a map when a previous change of the vehicle height is in the raising direction and a map when the previous change of the vehicle height is in the lowering direction are set as correction load maps. A correction load map in the raising direction or the lowering direction is selected according to a direction of the previous change of the vehicle height, the spring borne correction load is calculated, and the spring borne correction load is added to the spring borne basic load to calculate the spring borne load.

According to this technology of the related art, the spring borne correction load in the raising direction and the lowering direction includes a load that offsets an error caused by hysteresis of the air spring and a load that offsets an error caused by a load burden of other spring elements. Therefore, by adding the spring borne correction load to the spring borne basic load, a spring borne load that does not include both the error caused by the hysteresis of the air spring and the error caused by the load burden of other spring elements can be obtained, and the estimation accuracy of the spring borne load can be improved.

The air spring generally includes a component formed of a rubber member or the like. Elastic deformation characteristics and the like of the rubber member are greatly changed depending on a temperature thereof. Therefore, when a predetermined internal pressure is applied on a diaphragm of the air spring, expansion and contraction characteristics of the rubber member change when the temperature is different. As a result, even when the expansion state of the diaphragm is the same, a difference in the internal pressure occurs if the temperature is different.

As described above, although the air spring is affected by the temperature, the load estimation device of the related art does not take a factor of the temperature into consideration. Therefore, a calculation of a load portion based on the internal pressure of the air spring and the length of the air spring also includes a certain error.

Thus, a need exists for a load estimation device which is not susceptible to the drawback mentioned above.

SUMMARY (Feature Configuration)

A feature configuration of a load estimation device according to an aspect of this disclosure includes: an air spring having a diaphragm that expands and contracts due to supply and exhaust of air, and configured to support a support body in a liftable manner; an auxiliary support portion configured to support the support body separately from the air spring; a displacement sensor configured to measure a length of the air spring; a pressure sensor configured to measure an internal pressure of the air spring; a temperature sensor disposed together with the air spring, and configured to measure a temperature of the air spring; and a calculation unit configured to calculate a spring load supported by the air spring based on measured results of the displacement sensor, the pressure sensor and the temperature sensor.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment (Overview)

A load estimation device disclosed here can be loaded on a vehicle body that is operated for carrying a load, such as a truck. In particular, in physical distribution implemented by a vehicle body, weight management of the load is important. In order to appropriately maintain traveling characteristics of the vehicle body, it is also important to grasp a spring load and a total weight of the vehicle body, in addition to the weight of the vehicle body for the physical distribution. According to the disclosure, in a support body provided with an air spring, a load of the support body is accurately grasped based on information of an internal pressure of the air spring and a length of the air spring. Hereinafter, embodiments disclosed here are described with reference to the drawings.

Figure 1A:
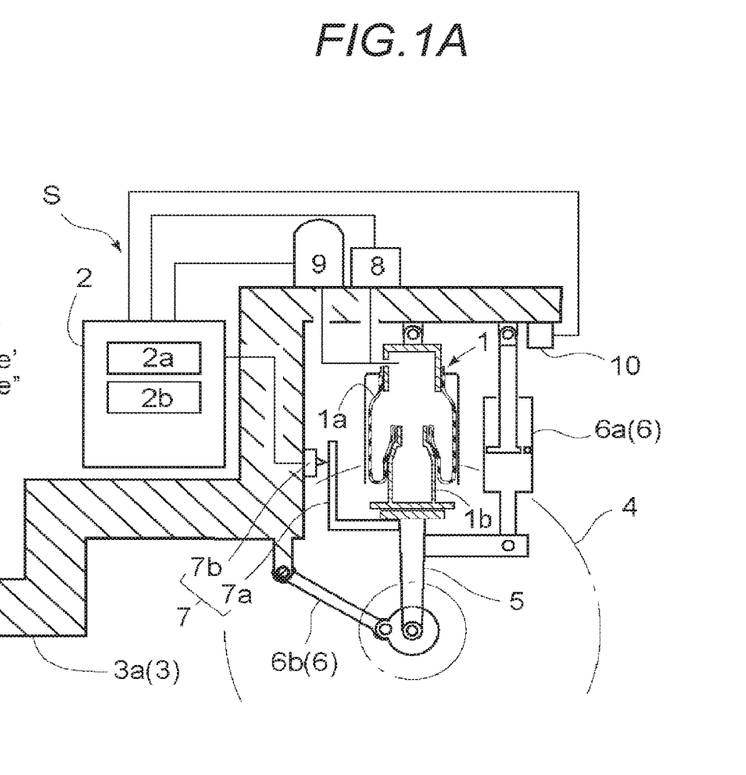
FIGS. 1A and 1B are explanatory diagrams illustrating a structure of a load estimation device disclosed here.
Figure 1B:
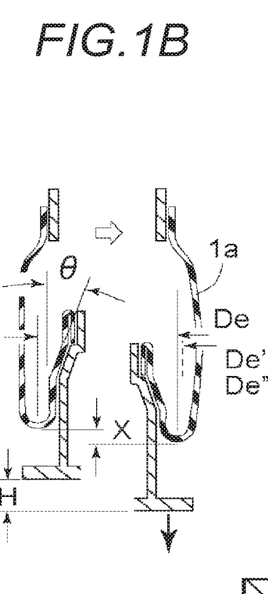
Figure 2:
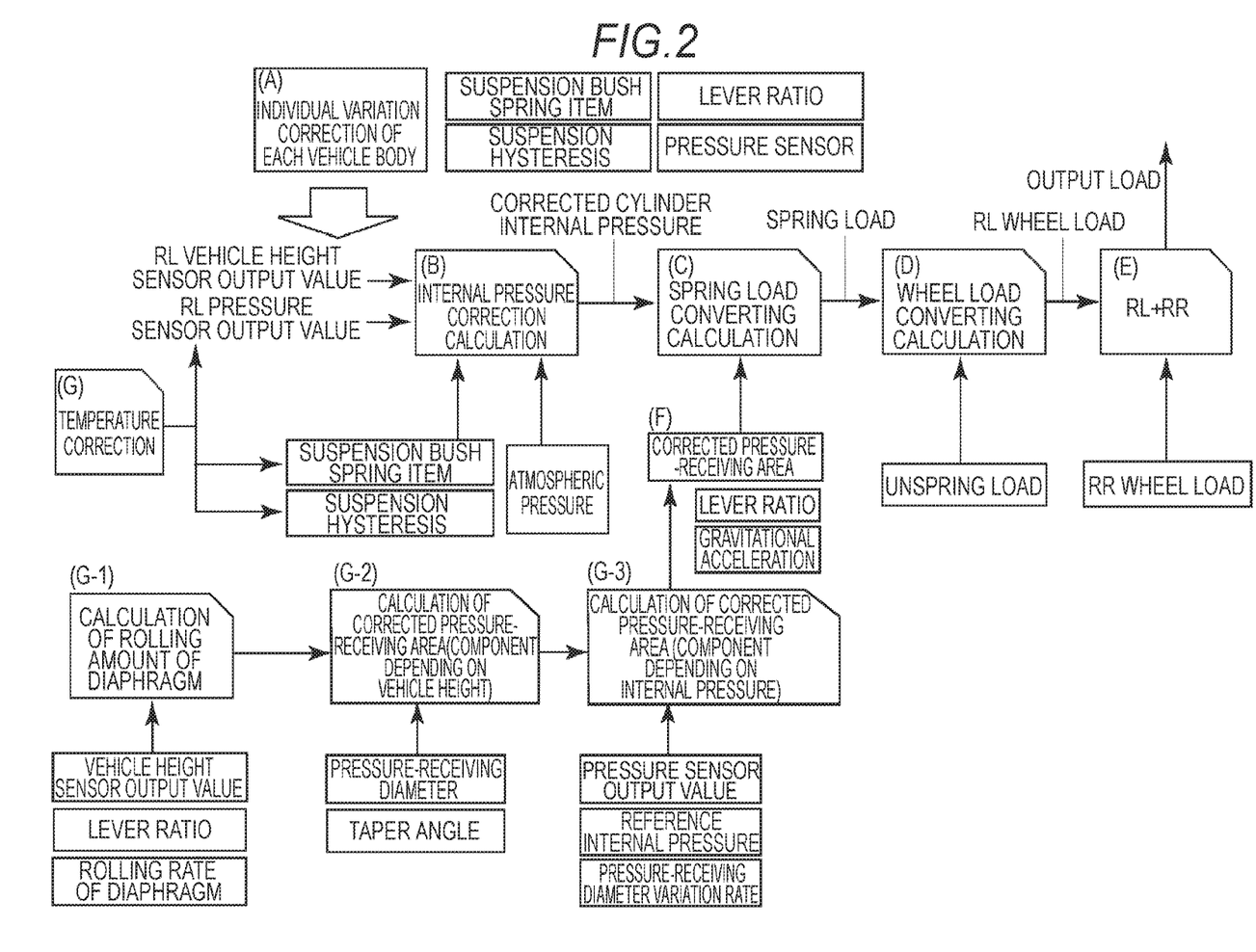
FIG. 2 is an explanatory diagram illustrating a flow of calculation of load estimation.

FIGS. 1A and 1B illustrate a device configuration of a load estimation device S provided with an air spring 1 according to a first embodiment. FIG. 2 illustrates a flow of calculation performed in a calculation unit 2a provided in a control unit 2 of the load estimation device S.

In the first embodiment, an example is illustrated in which the load estimation device S is applied to a vehicle body 3a in which a vehicle height is adjusted by the air spring 1. As illustrated in FIGS. 1A and 1B, in the vehicle body 3a which is a support body 3, the air spring 1 is used as a part of suspension. The air spring 1 includes a diaphragm 1a that expands and contracts due to supply and exhaust of air, and is attached across the vehicle body 3a and a part of a suspension link 5 that supports a wheel 4. Further, an auxiliary support portion 6 different from the air spring 1, such as a shock absorber 6a and various rods 6b for defining front and rear positions of the wheel 4, is provided between the suspension link 5 and the vehicle body 3a.

The vehicle body 3a is provided with a displacement sensor 7 that measures a length of the air spring 1 and a pressure sensor 8 that measures an internal pressure of the air spring 1. The displacement sensor 7 includes, for example, a marking unit 7a provided on any position of the air spring 1 or on the suspension link 5 in a position in a vicinity of the air spring 1, and a measuring unit 7b that measures an up/down displacement of the marking unit 7a. The marking unit 7a and the measuring unit 7b are not limited to a contact type and a non-contact type, and various measuring devices can be used.

The vehicle body 3a is provided with a pump 9 that supplies and exhausts air for the air spring 1. The pressure sensor 8 is connected to a part of a pipe connecting the pump 9 and the air spring 1.

A temperature sensor 10 is provided in a location in a vicinity of the air spring 1, and in an environment having a temperature equivalent to that of the air spring 1. An operational error corresponding to the temperature of the air spring 1 and the like is corrected by the temperature sensor 10 as described later.

A control unit 2 is mounted in the vehicle body 3a, and the control unit 2 includes such as a storage unit 2b that stores various data, and the calculation unit 2a which calculates the internal pressure of the air spring 1 based on data measured by the displacement sensor 7, the pressure sensor 8 and the temperature sensor 10.

In the vehicle body 3a provided with the load estimation device S, the vehicle height is set by adjusting the internal pressure of the air spring 1. The internal pressure of the air spring 1 is constantly or periodically measured by the pressure sensor 8. The length of the air spring 1 changes depending on the internal pressure, and an approximate supporting load can be known by the internal pressure. However, the suspension of the vehicle body 3a has the auxiliary support portion 6 and the like in addition to the air spring 1, and a ratio (lever ratio r) of loads that the air spring 1 and the auxiliary support 6 respectively bear changes as an outer shape of the air spring 1 changes.

Further, the diaphragm 1a constituting the air spring 1 is generally cylindrical and an intermediate portion thereof along a length direction is folded. A position of the folded portion changes due to the supply and exhaust of the air, and an overall length of the air spring 1 changes, thereby changing a support height of the support body 3. However, deformation characteristics of components made of rubber, such as the diaphragm 1a and various bushes, change under an effect of the internal pressure. That is, a spring load of the entire vehicle body 3a cannot be accurately known only by the internal pressure of the air spring 1.

Therefore, the control unit 2 grasps a shape and the like of the air spring 1 based on a correlation between the internal pressure of the air spring 1 and the length of the air spring 1 stored in advance, and calculates the spring load as taking changes on support states of the auxiliary support portion 6 and the like into consideration. Further, the deformation characteristics and the like of components constituting the air spring 1 and the auxiliary support portion 6 change depending on temperature. Therefore, temperature correction is important for calculating an accurate spring load. Hereinafter, a method of calculating the spring load in the present load estimation device S will be specifically described.

(Acquisition of Displacement-Internal Pressure Relationship of Air Spring)

In order to calculate the spring load based on the internal pressure of the air spring 1, firstly, it is necessary to grasp a deformation characteristic of the air spring 1. The deformation characteristic is based on a design of the air spring 1 to be used, and specifically, a displacement-internal pressure relationship indicates a correlation between a change in the length of the air spring 1 and the internal pressure at that time.

(Acquisition and Storage of Standard Displacement-Internal Pressure Relationship (Hereinafter Referred to as "Standard Loop"))

Figure 3:
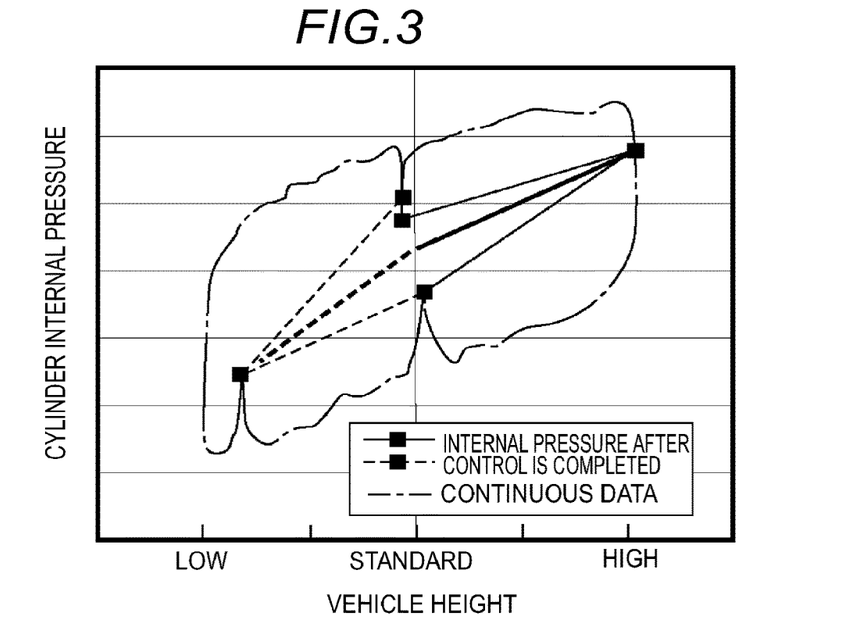
FIG. 3 is a graph illustrating a relationship between a vehicle height and a cylinder internal pressure of an air spring.

In general, the air spring 1 has a basic standard loop for each model based on the design. This relationship is illustrated in FIG. 3, for example. This process corresponds to steps A and B illustrated in FIG. 2.

In FIG. 3, a horizontal axis represents a length change of the air spring 1, that is, the vehicle height in this example, and a vertical axis represents the internal pressure, specifically, the cylinder internal pressure of the air spring 1. A long dashed short dashed line indicates a relationship between the vehicle height and the cylinder internal pressure when the air is supplied to and exhausted from the air spring 1 and the vehicle height is changed between a high region and a low region with respect to a reference vehicle height. Such history data of vehicle height-cylinder internal pressure is measured a plurality of times and averaged to improve the accuracy.

Solid lines and broken lines in FIG. 3 connect positions to indicate relationships of the vehicle height-cylinder internal pressure when the supply and exhaust of the air is temporarily stopped and the cylinder internal pressure is stabilized in cases where a vehicle height change reaches the reference vehicle height where the vehicle height change is zero, the high region and the low region. A region where the vehicle height is higher than the reference vehicle height is indicated by the solid line, and a region where the vehicle height is lower than the reference vehicle height is indicated by the broken line. Further, average correlations when the vehicle height increases and decreases in each region are indicated by thick lines.

As is clear from the above, the cylinder internal pressure rises more slowly in response to the vehicle height change in the case where the vehicle height is in the high region, as compared with the case where the vehicle height is in the low region. This is a characteristic based on a structure of the air spring 1 itself, or a structure in which the air spring 1 is mounted, such as a change characteristic of members constituting the air spring 1 and the auxiliary support portion 6.

Further, hysteresis of certain extend is observed in the cylinder internal pressure of the air spring 1 after the vehicle height is increased and decreased. This is mainly because rubber members constituting the air spring 1 and the auxiliary support portion 6 have different tensile and compressive deformation characteristics on an extension side and a contraction side.

This standard loop is stored in the storage unit 2b. In order to increase calculation accuracy of the spring load, in the present embodiment, a high-side loop when the spring is displaced from the reference vehicle height to a higher side, a low-side loop when the spring is displaced from the reference vehicle height to a lower side, and an average correlation obtained by linearly approximating the high-side loop and the low-side loop are stored. Such a standard loop or the average correlation may be stored in a relational expression corresponding to the displacements, or may be provided with a map in which a displacement amount and an internal pressure value are in one-to-one correspondence.

(First Acquisition-Storage Example of Individual Information for Each Vehicle Body)

When the air spring 1 is mounted on the vehicle body 3a, since an assembly error of a member on a side of the vehicle body 3a, or a manufacturing error and an attaching error of a member for attaching the air spring 1 to the vehicle body 3a, or the like occur, a predetermined correction is required in a case where the spring load is calculated based on a signal obtained from the pressure sensor 8 of the air spring 1. For this purpose, for example, before the air spring 1, the auxiliary support portion 6, the displacement sensor 7 and the pressure sensor 8 are assembled on the vehicle body 3a and a completed product is shipped, it is preferable to obtain the displacement-internal pressure relationship of each vehicle body 3a again (steps A and B in FIG. 2).

Specifically, in a case where the air is supplied to and exhausted from the air spring 1, when the vehicle is at a room temperature and is empty with no luggage loaded, and the vehicle height is set as the reference vehicle height, firstly, the internal pressure at this time is actually measured. Next, a vehicle height-internal pressure relationship is actually measured a plurality of times while being changed, and measured values are averaged to obtain an individual (displacement-internal pressure) relationship (hereinafter, referred to as a "measurement individual loop").

The reference vehicle height at this time may be measured according to a measurement part of the displacement sensor 7 mounted on the vehicle body 3a. For example, any configuration may be used, such as a configuration for measuring a distance between any part of the air spring 1 and any part of the vehicle body 3a that moves relatively to the part of the air spring 1, or a configuration for measuring a distance between any part of the vehicle body 3a supported by the air spring 1 and the ground. The measurement individual loop obtained in this way and an individual reference internal pressure which is an internal pressure of the air spring 1 when the vehicle height is at the reference vehicle height are stored in the storage unit 2b.

This storage example may be appropriately selected. For example, as to be described later, the standard loop and the measurement individual loop are combined together to obtain a difference therebetween, and the spring load to be described later can be calculated. However, in the first embodiment, the standard loop is rewritten as the measurement individual loop. According to this configuration, the number of loops used for calculation is reduced, and a calculation load is reduced. It should be noted that the standard loop is not deleted from the storage unit 2b, but only need to be excluded from a calculation process. In this way, for example, the vehicle height-internal pressure relationship at the room temperature is grasped for each vehicle body 3a.

As described above, the load can be estimated more accurately by measuring the displacement-internal pressure correlation of the air spring 1 used for the load estimation calculation after a configuration of the support body 3, that is, the vehicle body 3a is determined.

(Second Acquisition-Storage Example of Individual Information for Each Vehicle Body)

Both the standard loop and the measurement individual loop may be stored as the storage example of the measurement individual loop. In this case, the internal pressures of the two loops are compared according to the vehicle height change to obtain a difference therebetween, and this difference is stored as a correction value. This process is steps A and B in FIG. 2.

For example, in the measurement individual loop, a measured reference internal pressure value when the vehicle height is at the reference vehicle height is compared with a standard reference internal pressure value when the vehicle height is at the reference vehicle height in the standard loop stored in advance, and an individual reference internal pressure correction value ($\Delta Ps$) is calculated.

In addition, a measured vehicle height-dependent internal pressure value in a state where the vehicle height is freely displaced is calculated in the high region and the low region of the measurement individual loop, and this value is compared with an internal pressure value at the same displacement in the standard loop to obtain an individual change internal pressure correction value ($\Delta Phei$) corresponding to a change amount of the vehicle height.

The individual reference internal pressure correction value ($\Delta Ps$) and the individual change internal pressure correction value ($\Delta Phei$) are stored in the storage unit 2b. When the load estimation device S is operated, in the calculation unit 2a, an actual internal pressure is calculated each time by adding the individual reference internal pressure correction value ($\Delta Ps$) or the individual change internal pressure correction value ($\Delta Phei$) to a value of the standard loop according to an actual measured value of the vehicle height.

(Calculation of Spring Load)

By obtaining the displacement-internal pressure relationship for each vehicle body 3a in this manner, basic information for obtaining the spring load is obtained. In order to calculate the spring load from the basic information, for example, the following equation is used (this process is step B in FIG. 2).

$$Pi = Ps - Patm - H \times \text{bush spring component} \qquad \text{(Equation A)}$$

$Pi$: an internal pressure correction value of the air spring 1

$Ps$: a measured value of the pressure sensor 8

Patm: an atmospheric pressure

H: the vehicle height

Here, the (H×bushh spring component) is synonymous with the individual change internal pressure correction value (ΔPhei).

In other words, by obtaining the displacement-internal pressure relationship based on any of the above-described first acquisition-storage example and the second acquisition-storage example, the (Ps−H×bush spring component) in Equation A is calculated. As a result, the internal pressure correction value Pi of the air spring 1 is obtained by subtracting the atmospheric pressure Patm from the (Ps−H×bush spring component).

The spring load can be obtained as follows by using the internal pressure correction value Pi (step C in FIG. 2).

$$Fw=(Pi \times Ae'' \times r)/9.81 \quad \text{(Equation B)}$$

Fw: the spring load

Ae″: a correction pressure-receiving area of the air spring 1 r: a lever ratio 9.81: gravitational acceleration

In Equation B, Ae″ is a representative value of the pressure-receiving area. A shape such as the cross-sectional area of the air spring 1 changes when the air spring 1 expands and contracts, but the spring load is obtained by using the pressure-receiving area when the vehicle body 3*a* is at a certain vehicle height as the representative value. The lever ratio r is a load supporting ratio between the air spring 1 and the auxiliary support portion 6. The vehicle body 3*a* is supported by the air spring 1 and the auxiliary support portions 6 other than the vehicle body 3*a*. When the vehicle height changes, a suspension member angle or the like changes, and the load supporting ratio between the air spring 1 and the auxiliary support portion 6 changes, so that the lever ratio r is corrected. The gravitational acceleration 9.81 is a constant used for converting a unit of pressure into a unit of load.

As described above, the spring load is calculated by multiplying the internal pressure correction value Pi of the air spring 1 by the Ae″ value, which is a representative area of the air spring 1, and by the lever ratio r. Further, a corrected pressure-receiving area Ae″ of the air spring 1 can be obtained, for example, as follows (steps F-1 to F-3 in FIG. 2).

The representative area of the air spring 1 changes according to a height of the air spring 1 and further changes according to the increase and decrease of the internal pressure. That is, a change in the height of the air spring 1 is a change in a height of the diaphragm 1*a* constituting the air spring 1. In this case, when the height increases, a diameter of the diaphragm 1*a* slightly increases. Further, since the diaphragm 1*a* is made of rubber or the like, the diameter increases when the internal pressure increases. Therefore, the representative area of the diaphragm 1*a* is specified in consideration of the height and the internal pressure.

A representative diameter value of the diaphragm 1*a* when the height of the diaphragm 1*a* changes is calculated as follows. Firstly, a rolling amount X of the diaphragm 1*a* is calculated (step F-1 in FIG. 2). As illustrated in FIG. 1B, the diaphragm 1*a* is generally formed by folding a cylindrical rubber member at an intermediate position in a longitudinal direction. When the height of the diaphragm 1*a* changes, a folding position of the diaphragm 1*a* changes, and the representative diameter value changes. The rolling amount X is, for example, as illustrated in FIG. 1B, a height difference of a lower end of a folded portion of the diaphragm 1*a* before and after expansion and contraction of the diaphragm. The rolling amount is determined by the following equation.

$$X=H \times r \times \text{rolling rate} \quad \text{(Equation C)}$$

X: the rolling amount of the diaphragm 1*a*

H: an output value of the displacement sensor 7 (for example, + on an extending side)

r: the lever ratio

The output value of the displacement sensor 7 is multiplied by the lever ratio r, which is because a measured value of the displacement sensor 7 does not directly indicate the length change of the air spring 1 since a measured position of the vehicle height and a position of the air spring 1 are separated by a predetermined distance.

The rolling rate is a constant for being substantially constant with respect to the output value H of the displacement sensor 7.

After the rolling amount of the diaphragm 1*a* is obtained, a first correction diameter of the diaphragm 1*a*, which depends on the vehicle height, is calculated based on the rolling amount by the following equation (step F-2 in FIG. 2).

$$De'=De+\tan\theta \times X \times 2 \quad \text{(Equation D)}$$

De′: the first correction diameter of the diaphragm 1*a* depending on the vehicle height De: a basic diameter of the diaphragm 1*a*

θ: an angle formed by a vertical direction and a shoulder portion of a piston 1*b* with which one end of the diaphragm 1*a* contacts (see FIG. 1B)

In other words, a sum of the basic diameter De (an interval between dashed lines in FIG. 1B) and a length between two locations swelling to both sides from the position of the basic diameter De (see the dotted line in FIG. 1B) is the first correction diameter of the diaphragm 1*a* depending on the vehicle height.

Next, correction of the diameter depending on the internal pressure of the diaphragm 1*a* is taken into consideration. That is, a variation depending on the internal pressure is added to the first correction diameter De′ of the diaphragm 1*a* depending on the vehicle height by the following Equation E (step F-3 in FIG. 2).

$$De''=De'-(PB-Ps)\times\text{pressure-receiving diameter variation rate} \quad \text{(Equation E)}$$

De″: a second correction diameter of the diaphragm 1*a* (indicated by a dotted line in accordance with a position of De′ for convenience in FIG. 1B)

De′: the first correction diameter of the diaphragm 1*a* depending on the vehicle height PB: a reference pressure Ps: a measured pressure pressure-receiving diameter variation rate: a constant Since a variation of the pressure-receiving diameter of the diaphragm 1*a* has a linear correlation with a change of a difference between the reference pressure and the measured pressure, the pressure-receiving diameter variation rate is a constant.

A correction pressure-receiving area Ae″ of the diaphragm 1*a* is obtained based on a formula of a circle area (Equation F) as follows (step F in FIG. 2), as a result of obtaining the second correction diameter De″ of the diaphragm 1*a* as described above.

$$Ae''=(De'' \times De'' \pi)/4 \quad \text{(Equation F)}$$

Ae″: correction pressure-receiving area of the diaphragm 1*a*

De″: the second correction diameter of the diaphragm 1a
(Calculation of Wheel Load)

When the spring load supported by the air spring 1 is calculated, an unspring load according to the air spring 1 is further added, so as to calculate a wheel load supported by the air spring 1 by the following Equation G (see step D in FIG. 2).

$$WRL = Fw + \text{unspring load} \quad \text{(Equation G)}$$

WRL: a wheel load of the vehicle body 3a
Fw: the spring load

In this way, the wheel loads are obtained for each air spring 1 mounted on the vehicle body 3a, and the wheel loads of all the air springs 1 are added together (step E in FIG. 2). Therefore, a sum of wheel loads of the wheels 4 supported by the air spring 1 can be obtained. If the air springs 1 are mounted on all the wheels 4, a total weight of the vehicle body 3a can be obtained.

(Temperature Correction)

In the load estimation device S of the first embodiment, in order to calculate the spring load more accurately, the temperature correction is applied to the standard loop or the measurement individual loop. Specifically, in addition to the air spring 1, the temperature sensor 10 for measuring a temperature of the air spring 1 is provided. Based on a result measured by the temperature sensor 10, the calculation unit 2a performs temperature correction on the internal pressure of the air spring 1 (step G in FIG. 2).

A reason why the temperature correction is required is that it is necessary to correct a hardness change of a rubber material forming the air spring 1 according to, for example, an environmental temperature.

For example, deformation characteristics of the rubber member change according to the temperature. The rubber member in a high temperature environment is easier to deform than in a low temperature environment. Therefore, if the air spring 1 is at the reference height, in the high temperature environment, a length thereof is easier to be settled, and the internal pressure is low. On the other hand, when the temperature is low, in order to set the air spring 1 to the reference height, the rubber member needs to be deformed against deformation resistance of the rubber member, so that a large internal pressure is required.

When the temperature changes, a deformation speed of the rubber member when the folding position of the diaphragm 1a changes also changes. For example, the deformation resistance of the rubber member increases as the temperature decreases, and a part of the internal pressure is offset by the resistance. Therefore, the diaphragm 1a cannot be deformed to an original height thereof corresponding to the internal pressure.

Further, when a predetermined pressure is applied to the diaphragm 1a and then the pressure is removed, the stretched rubber member does not immediately return to an original length, and somewhat hysteresis occurs. Such hysteresis increases as the temperature decreases.

The temperature affects not only the rubber component of the air spring 1 but also, for example, rigidity of the metal diaphragm 1a constituting the pressure sensor 8, and thus an output value of the pressure sensor 8 is affected by the temperature.

Therefore, in the load estimation device S according to the first embodiment, by considering the temperature when the spring load is calculated, pressure errors caused by the components constituting the air spring 1, the pressure sensor 8, and the like are reduced.

Here, three factors that need to consider the effect of the temperature are listed again.

A first factor is that the hardness of the rubber constituting the diaphragm 1a changes, sliding resistance and the like of the diaphragm 1a changes with the expansion and contraction of the air spring 1, and the vehicle height corresponding to a predetermined internal pressure changes.

A second factor is that when the hardness of the diaphragm 1a, the rubber bush and the like constituting the air spring 1 changes, and a shape and thickness of the rubber member change between a state where the internal pressure is high and a state where the internal pressure is low, a shape restoration speed changes and an error occurs in the relationship between the vehicle height and the internal pressure. This factor causes the hysteresis mainly when the vehicle height repeatedly expands and contracts. The hysteresis changes according to an amount by which the vehicle height is displaced from the reference height to the high region or the low region. Generally, the hysteresis increases as a maximum displacement increases.

A third factor is that the diaphragm 1a provided in the pressure sensor 8 that measures the internal pressure changes in the rigidity according to the temperature, and an error occurs in the measured pressure value.

In order to eliminate such a temperature correction factor, in the load estimation device S of the present embodiment, the temperature sensor 10 is provided, and temperature-dependent correlations (temperature-dependent loops) between the vehicle height and the internal pressure of the air spring 1 measured under a plurality of temperatures are stored in the storage unit 2b. The calculation unit 2a calculates the internal pressure of the air spring 1 by using a correlation measured at a temperature closest to the temperature measured by the temperature sensor 10 among the temperature-dependent correlations.

(First Temperature Correction Example)

As an example of the temperature correction based on the temperature-dependent correlation, for example, the standard loop stored in the storage unit 2b described above is compared with each temperature-dependent loop measured at each temperature, and a difference of the internal pressure at each vehicle height at each temperature is stored in the storage unit 2b as a temperature-dependent internal pressure correction value ($\Delta Pt$). When the storage unit 2b of the load estimation device S stores the standard loop and the measurement individual loop, a relationship between these two loops and each temperature-dependent loop may be compared.

Figure 4:
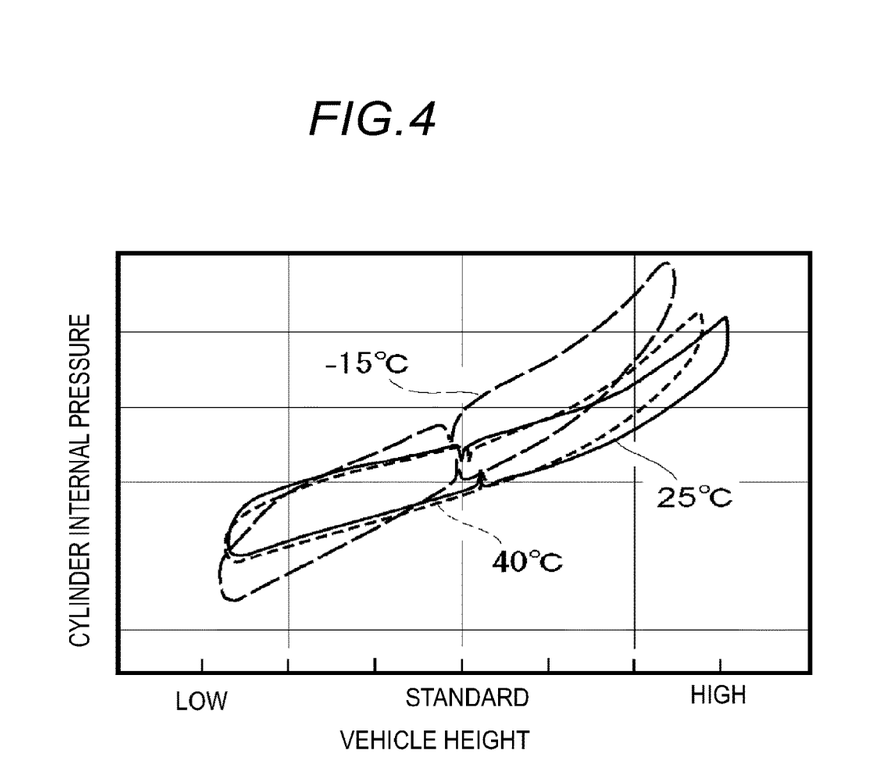
FIG. 4 is a graph illustrating temperature-dependent relationships between the vehicle height and the cylinder internal pressure of the air spring.

For this purpose, as illustrated in FIG. 4, for example, temperature-dependent (vehicle height-internal pressure) relationships (temperature-dependent loops) are measured for environmental temperatures (−30° C., −15° C., 25° C., 40° C., 80° C.) predicted when the load estimation device S is operated. Among these temperatures, in particular, a 25° C. standard loop, and a 40° C. loop and a −15° C. loop above and below the standard loop are actually measured. However, for a 80° C. loop and a −30° C. loop, since the vehicle body 3a is rarely used at such temperatures, the relationship may be measured or inferred from the above three types of measurement results.

The calculation unit 2a corrects the internal pressure of the air spring 1 by adding the temperature-dependent internal pressure correction value ($\Delta Pt$) corresponding to each measured temperature to the internal pressure based on the standard loop or the measurement individual loop each time. By using this correction value, the actual internal pressure Pi of the air spring 1 is calculated by the above Equation A.

(Second Temperature Correction Example)

As another example of the temperature correction based on the temperature-dependent correlation, a specific temperature-based loop corresponding to the measured temperature is selected to replace the standard loop or the measurement individual loop, and the internal pressure of the air spring 1 may be calculated based on the specific temperature-based loop.

Even when the rubber member constituting the air spring 1 and the components of the pressure sensor 8, and the like are somewhat affected by the temperature, the correlation between the length and the internal pressure of the air spring 1 can be obtained by an output including these effects. As in this configuration, by selecting and using the temperature-dependent correlation related to the closest temperature according to the temperature measured by the temperature sensor 10, the calculation unit 2a uses one vehicle height-internal pressure loop for calculation. Since the environmental temperature of the air spring 1 does not greatly change while the vehicle body 3a is travelling, one temperature-dependent loop may be selected when the vehicle body 3a is used once. Therefore, a load on the calculation unit 2a that refers to the loop in accordance with the vehicle height is significantly reduced, and a calculation speed is increased.

Further, in each of the temperature-dependent loop and the standard loop, the characteristics of the components constituting the air spring 1 and the like are reflected, but actually some errors are contained. Therefore, in the calculation, using a single loop can reduce errors than using a plurality of loops together.

(Effect of Temperature Correction)

Figure 5:
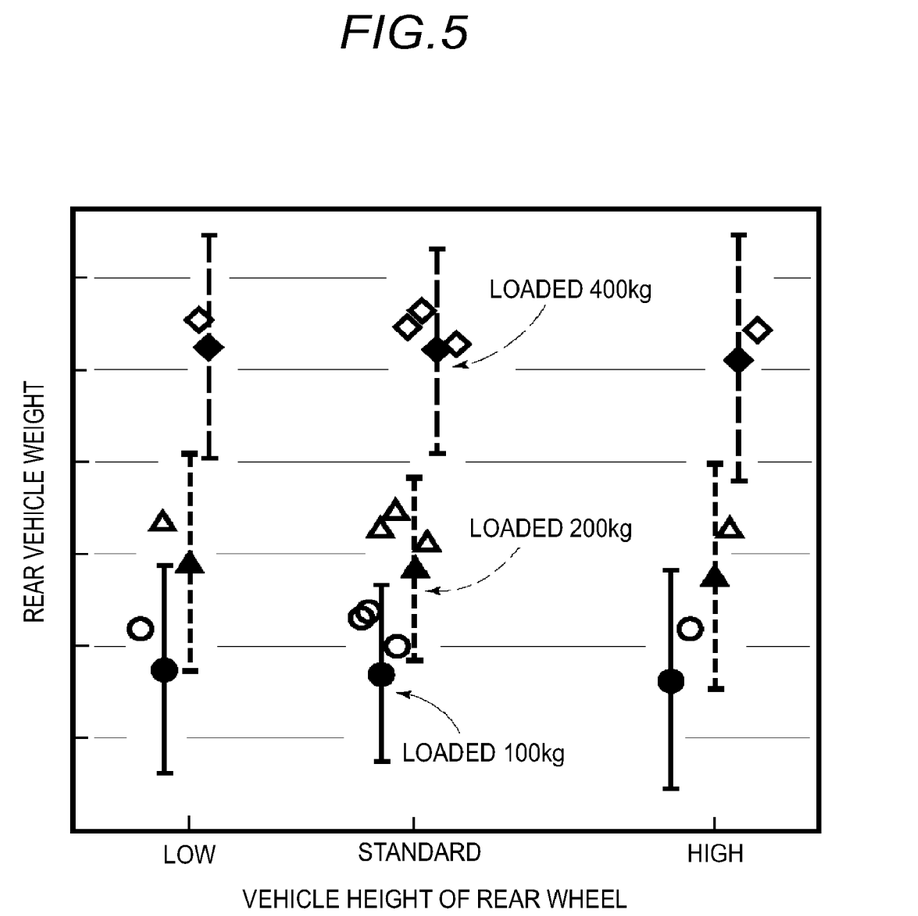
FIG. 5 is a graph illustrating a result of the load estimation of the air spring.

FIG. 5 illustrates load estimation results when temperature correction is performed during load estimation by the air spring 1. Here, the air spring 1 is installed on a rear wheel of a truck, and calculation results when the load is 100 kg (solid line, circle mark), 200 kg (first broken line, triangle mark), 400 kg (second broken line, square mark) are illustrated. The measurements are performed under three conditions: a state where the vehicle height is at the reference vehicle height; a state where the vehicle height is higher than the reference vehicle height; and a state where the vehicle height is lower than the reference vehicle height.

Black marks indicate actual loads in all conditions. A range of vertical lines extending up and down is an allowable range of a load estimation value. The estimated calculation value is within the allowable estimation range in all conditions. Each of the estimated values is slightly heavier than the actual load. Estimating a little heavier in this way is advantageous in that inconvenience of excess load can be reliably prevented.

INDUSTRIAL APPLICABILITY

The load estimation device disclosed here can be widely applied to various devices that require a height adjusting function and a load estimating function, such as a vehicle body using an air spring as a part of the suspension.

(Feature Configuration)

A feature configuration of a load estimation device according to an aspect of this disclosure includes: an air spring having a diaphragm that expands and contracts due to supply and exhaust of air, and configured to support a support body in a liftable manner; an auxiliary support portion configured to support the support body separately from the air spring; a displacement sensor configured to measure a length of the air spring; a pressure sensor configured to measure an internal pressure of the air spring; a temperature sensor disposed together with the air spring, and configured to measure a temperature of the air spring; and a calculation unit configured to calculate a spring load supported by the air spring based on measured results of the displacement sensor, the pressure sensor and the temperature sensor.

(Effect)

The internal pressure of the air spring changes in accordance with the change of a support height of the support body, which is affected by deformation of components made of rubber, such as a diaphragm and various bushes constituting the air spring. For example, the diaphragm is generally cylindrical and an intermediate portion thereof along a length direction is folded. A position of the folded portion changes due to the supply and exhaust of air, and an overall length of the air spring changes, thereby changing a support height of the support body. At this time, since hardness of the rubber material changes according to an environmental temperature, a deformation speed of the rubber member changes when the position of the folded portion of the diaphragm changes. Deformation resistance of the diaphragm is increased as the temperature decreases, and a part of the internal pressure is offset by the resistance. Therefore, the diaphragm cannot be deformed to an original height thereof corresponding to the internal pressure.

Further, when the rubber member receives a predetermined external force, amounts of expansion and contraction vary depending on the temperature. That is, even when the air spring has a predetermined length, the internal pressure varies depending on the temperature.

Further, when a predetermined pressure is applied to the diaphragm and then the pressure is removed, the stretched rubber member does not immediately return to an original length, and somewhat hysteresis occurs. Such hysteresis increases as the temperature decreases.

The temperature affects not only the rubber component of the air spring but also, for example, rigidity of a metal diaphragm constituting the pressure sensor, and thus an output value of the pressure sensor is affected by the temperature.

Therefore, according to the configuration, a load estimation device can be obtained in which by considering the temperature during calculating of the spring load, pressure errors caused by the components constituting the air spring, the pressure sensor, and the like are reduced.

(Feature Configuration)

The load estimation device according to the aspect of this disclosure may further include: a storage unit that stores a correlation between a measured value of the displacement sensor and a measured value of the pressure sensor, and shape information of the air spring, the calculation unit may be configured to calculate an internal pressure of the air spring corresponding to a support height of the support body based on the correlation, and the calculation unit may be configured to calculate the spring load based on the internal pressure of the air spring and the shape information, and the calculation unit is configured to perform temperature correction on the internal pressure of the air spring based on the temperature measured by the temperature sensor.

(Effect)

When the spring load is calculated, the storage unit stores the correlation between the measured value of the displacement sensor and the measured value of the pressure sensor. This correlation is measured in advance at, for example, a room temperature.

In this configuration, when this correlation is utilized, temperature correction is performed on the internal pressure of the air spring according to the temperature measured by the temperature sensor. As described above, the spring load supported by the air spring can be accurately obtained by correcting the internal pressure according to the measured temperature while maintaining a basic relationship between the displacement and the internal pressure of the air spring.
(Feature Configuration)

In the load estimation device according to the aspect of this disclosure, temperature-dependent correlations measured at a plurality of temperatures may be stored in the storage unit, and the calculation unit may be configured to calculate the internal pressure of the air spring using a temperature-dependent correlation measured at a temperature closest to the temperature measured by the temperature sensor.
(Effect)

The correlation between the length and the internal pressure of the air spring is obtained considering structural elements to which the air spring is attached, the rubber members constituting the air spring, the pressure sensor and the like are affected by the temperature. On the other hand, when the correlation is measured, some measurement errors are included. Therefore, it is preferable that the correlations used for the calculation are as less as possible to prevent accumulation of the errors. Therefore, in this configuration, by selecting and using one temperature-dependent correlation related to a closest temperature according to the temperature measured by the temperature sensor, an error of the spring load value calculated for the air spring can be minimized.
(Feature Configuration)

In the load estimation device according to the aspect of this disclosure, the correlation may be measured after the air spring, the auxiliary support portion, the displacement sensor, and the pressure sensor are assembled on the support body.
(Effect)

When the air spring is used in the suspension of the vehicle body or the like, a dimensional error of the air spring itself, a manufacturing error of the member for attaching the air spring to the support body, and an error of attaching the air spring to the support body occur. Since such error differs for each vehicle body, the expansion and contraction characteristics of the air spring also differ for each vehicle body.

Therefore, as in the configuration, the load can be estimated more accurately by measuring the air spring displacement-internal pressure correlation used for load estimation calculation after a configuration of the support body is determined.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A load estimation device comprising:
an air spring having a diaphragm that expands and contracts due to supply and exhaust of air, and configured to support a support body in a liftable manner;
an auxiliary support portion configured to support the support body separately from the air spring;
a displacement sensor configured to measure a length of the air spring;
a pressure sensor configured to measure an internal pressure of the air spring;
a temperature sensor disposed together with the air spring, and configured to measure a temperature of the air spring; and
a control unit configured to calculate a spring load supported by the air spring based on measured results of the displacement sensor, the pressure sensor and the temperature sensor,
wherein the control unit further includes a memory that stores a correlation between a measured value of the displacement sensor and a measured value of the pressure sensor, and shape information of the air spring,
wherein the control unit is configured to calculate the internal pressure of the air spring corresponding to a support height of the support body based on the correlation, and calculate the spring load based on the internal pressure of the air spring and the shape information, and
wherein the control unit is configured to perform temperature correction on the internal pressure of the air spring based on the temperature measured by the temperature sensor.

2. The load estimation device according to claim 1, wherein
temperature-dependent correlations measured at a plurality of temperatures are stored in the memory, and
the control unit is configured to calculate the internal pressure of the air spring using a temperature-dependent correlation measured at a temperature closest to the temperature measured by the temperature sensor.

3. The load estimation device according to claim 1, wherein
the correlation is measured after the air spring, the auxiliary support portion, the displacement sensor, and the pressure sensor are assembled on the support body.

* * * * *